(12) United States Patent
Hehl

(10) Patent No.: US 6,517,337 B1
(45) Date of Patent: Feb. 11, 2003

(54) INJECTION MOLDING MACHINE HAVING A MODULAR CONSTRUCTION WHICH COMPRISES A PLURALITY OF DRIVE GROUPS

(76) Inventor: Karl Hehl, Arthur-Hehl-Strasse 32, Lossburg D-72290 (DE)

( * ) Notice: Subject to any disclaimer, the term of this patent is extended or adjusted under 35 U.S.C. 154(b) by 0 days.

(21) Appl. No.: 09/807,395
(22) PCT Filed: Oct. 9, 1999
(86) PCT No.: PCT/EP99/07582
§ 371 (c)(1), (2), (4) Date: Apr. 12, 2001
(87) PCT Pub. No.: WO00/21729
PCT Pub. Date: Apr. 20, 2000

(30) Foreign Application Priority Data

Oct. 14, 1998 (DE) .......................... 198 47 298

(51) Int. Cl.[7] .............................. B29C 45/64
(52) U.S. Cl. .................. 425/190; 425/589; 425/593
(58) Field of Search ............... 425/190, 192 R, 425/589, 593

(56) References Cited

FOREIGN PATENT DOCUMENTS

| DE | 22 47 386 | 3/1974 |
|---|---|---|
| DE | 195 36 565 | 4/1997 |
| DE | 195 36 567 | 4/1997 |
| DE | 197 31 833 | 1/1999 |
| DE | 197 50 057 | 6/1999 |
| EP | 0 576 925 | 1/1994 |
| WO | WO 97/12741 | 4/1997 |

Primary Examiner—Tim Heitbrink
(74) Attorney, Agent, or Firm—Cantor Colburn LLP

(57) ABSTRACT

The invention relates to an injection molding machine having a plurality of modular drive groups which are arranged on the injection molding side and on the mold closure side. According to the invention, at least one of the drive groups is connected to the injection molding machine via at least one multifunction element which, as an interface, makes it possible to optionally connect different types of drives, e.g., electromechanical drives, hydraulic drives, pneumatic drives, linear motors or electromagnetic drives as a drive group in an otherwise unmodified injection molding machine. Independent of the respective drive, space for the respectively used drive groups is provided on the injection molding machine in order to accommodate each type of drive. As a result, the structural requirements for an increased modularity are accomplished by using components which, to a great extent, are identical.

19 Claims, 16 Drawing Sheets

INJECTION MOLDING MACHINE HAVING A MODULAR CONSTRUCTION WHICH COMPRISES A PLURALITY OF DRIVE GROUPS

TECHNICAL FIELD

The invention relates to an injection molding machine for processing plastics materials and other plasticisable substances, such as ceramic or pulverulent substances, having a modular structure comprising a plurality of driving groups.

BACKGROUND OF THE INVENTION

Such modular structure is indeed not known in its entirety from prior art, but it is known from EP 0 576 925 A1, for example, to provide liquid-cooled electrical servomotors within individual driving groups of an injection molding machine, both on the side of the injection molding unit and on the mold-closing side. Indeed, such motors may therefore be optionally used for an injection molding machine, but it is necessary to change the actual connecting elements on the injection molding machine if other drive types are used. In consequence, numerous parts have to be provided, especially in the factory of the manufacturer, in order to construct machines totally in accordance with the wishes of the customers. In addition, this leads to longer delivery times.

SUMMARY OF THE INVENTION

On the basis of this prior art, the basic object of the present invention is to provide the structural prerequisites for increased modularity with an injection molding machine of the initially mentioned type, using largely identical component parts.

This object is achieved by an injection molding machine for processing plastics materials having a modular structure comprising a plurality of driving groups. The injection molding machine includes:

a machine base,
a mold closing unit having
  a stationary mold carrier connected to the machine base,
  a movable mold carrier, which provides a mold clamping chamber between itself and the stationary mold carrier
  at least one injection mold, the mold parts of which can be accommodated in the mold clamping chamber on the stationary mold carrier and on the movable mold carrier,
  a closing mechanism as a first driving group for moving the movable mold carrier towards the stationary mold carrier and away from said stationary mold carrier so as to close the injection mold, and
  force transmitting means for transmitting substantially the closing force from the closing mechanism to the stationary mold carrier,
and an injection molding unit, having
  a plasticizing unit, which comprises a plasticizing cylinder and a feeding means, which is accommodated in the plasticizing cylinder, as well as a nozzle mouth on the end face, which mouth lies in an injection axis,
  a carrier block, which is disposed on the machine base so as to be displaceable along the injection axis, and on which block the plasticizing unit is detachably mounted,
  an injection bridge,
  a metering drive for the feeding means of the plasticizing unit as a third driving group, which is connectable to the injection bridge,
  at least one nozzle moving drive, which is axis-parallel to the injection axis, as a fourth driving group for moving the nozzle mouth towards the injection mold and away from said mold, and
  at least one injecting means, which is axis-parallel to the injection axis, as a fifth driving group for the movement of the feeding means relative to the plasticizing cylinder,
wherein at least one of first driving groups is connectable to the injection molding machine via at least one multifunctional element, which serves as an interface selectively for the connection of at least two different drive types selected from the group consisting of electromechanical drives, hydraulic drives, pneumatic drives, linear motors and electromagnetic drives as the driving group with an otherwise unchanged injection molding machine, whereby space is made available for the driving groups, independently of the particular drive, on the injection molding machine for accommodating each type of drive.

Because of additional structural outlay, possibilities for connection to the parts of the injection molding machine are already provided in the preliminary section, so that the remaining parts of the injection molding machine already satisfy the various requirements of the different drive types, either hydraulically, pneumatically, electromechanically, as a linear motor or electromagnetically. If this additional outlay is provided during construction, this later facilitates the manufacture and reduces the additional outlay for each machine since, without creating greater problems, compliance with the wishes of the individual customers can be achieved. In this respect, the more interfaces are provided for different drive types, the quicker the machine can be delivered. Furthermore, this modularity provides possibilities for the customer himself to optimize the injection molding machine depending on the injection molded product. Thus, for example, for two-color injecting or for a large throughput, it may be advantageous to operate the injection molding unit electrically, while it may be advantageous, because of the speed with a small throughput, to operate the injection molding unit hydraulically. Because of the given modularity, the customer himself can even make the adaptation required for this.

For example, a rotation transmitting element may be provided in the injection bridge, which element is provided so that a rotary motor is connected to the rear end, or a driving wheel can be secured at a different location, so that this element is actuatable via a transmission, In such case, sufficient space is made available for all of the drives on the injection molding machine.

Structural elements may be provided in the injection bridge, which elements are even passive depending on the drive type and are not needed at all, but, on the other hand, they create the possibility of changing the drive type without any problems. In such case, the space required for the different drive types can be achieved when these structural parts, which are required for the different drive typos, can be combined in a very small space.

The movable mold carrier may be provided on the mold closing side, so that both electromechanical drives and hydraulic or pneumatic drives can be connected to the same structural parts. It should not be underestimated here that the structural part has to be prepared in this respect for the various requirements, whereby the tightness for the hydraulics has to be ensured in the same way as the introduction of forces has to be ensured for the electromechanical drive.

Additional advantages are found in the sub-claims.

BRIEF DESCRIPTIONS OF THE FIGURES

DETAILED DESCRIPTION OF PREFERRED EMBODIMENTS

Figure 16:
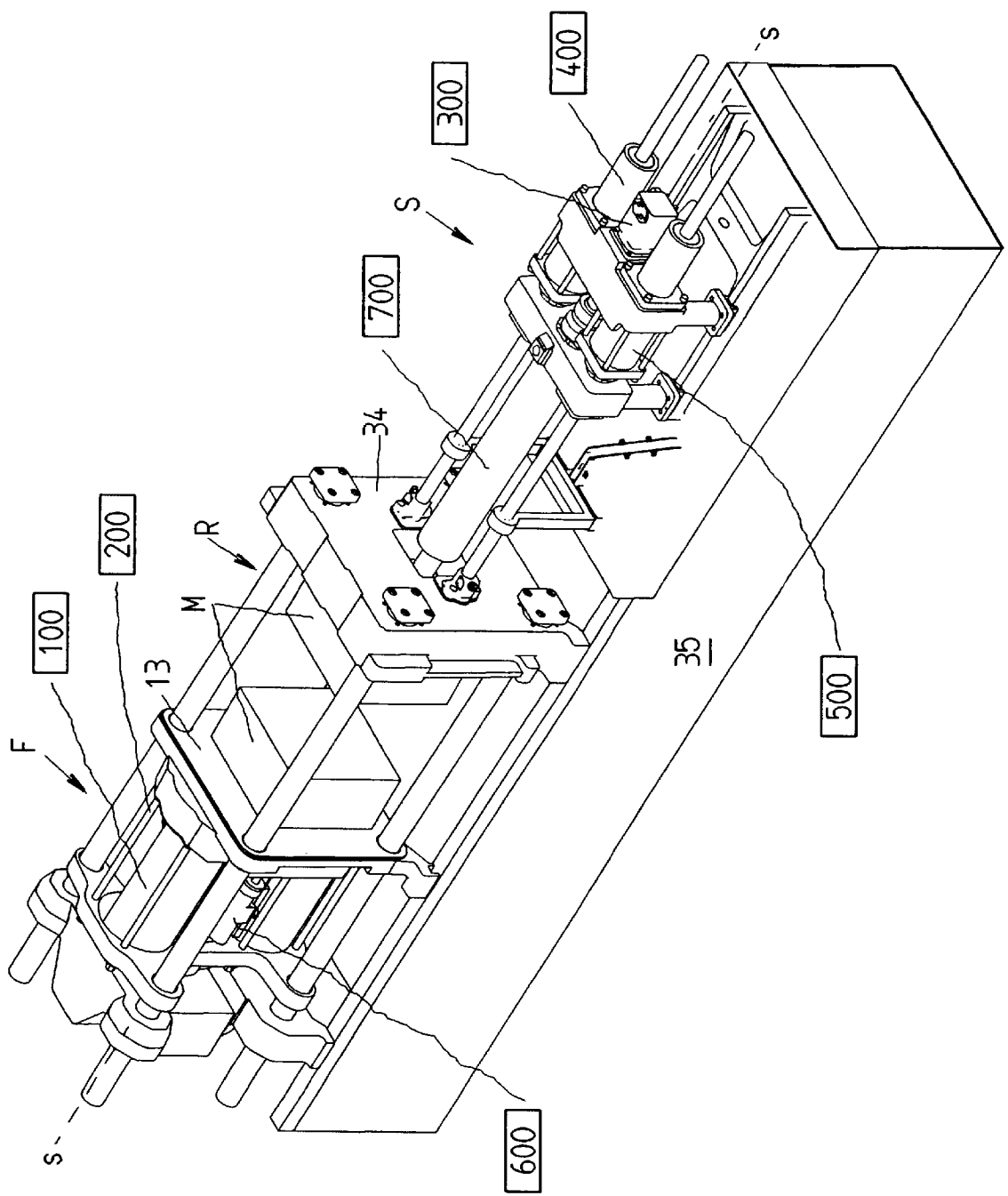
FIG. 16 is an isometric view of the injection molding machine provided with the driving groups.

The invention is now explained more detailed by way of example with reference to the accompanying drawings. However, the embodiments are only examples which should not limit the inventive concept to one specific actual arrangement The injection molding machine is used, for example, as a plastic injection molding machine for processing plasticisable substances, such as plastics materials, pulverulent or ceramic substances, for example. According to FIG. 16, the injection molding machine has a modular structure provided with a plurality of driving groups, some of which are associated with the mold closing unit F and some of which are associated with the injection molding unit S. Mold closing unit F and injection molding unit are disposed on the machine base 35.

The mold closing unit F has a stationary mold carrier 34 and a movable mold carrier 13. A mold clamping chamber R is formed between the two mold carriers, and molding parts of an injection mold M on the stationary mold carrier 34 and on the movable mold carrier 13 are accommodated in said chamber. The mold closing unit has a closing mechanism C, which simultaneously represents the first driving group 100 for moving the movable mold carrier towards the stationary mold carrier 34 and away from said stationary mold carrier. A first supporting element 25 is provided to support the closing mechanism C, and an additional supporting element may also be provided for "serial closing". The movable mold carrier is transferred for the mold closure via the first driving group 100 during this serial closing, while the closing force is applied by a separate driving group. The second driving group 200 serves as the device for applying the closing force and is used, more especially, when the first driving group 100 has transferred the movable mold carrier 13 for mold closure of the injection mold assembly M. If necessary, however, the first driving group 100 may be combined with the second driving group 200 by one and the same driving group, and such is possible, for example, more especially with an hydraulic solution.

Force transmitting means are provided in order to transmit forces, which are substantially produced during the application of the closing force, from the first supporting element 25 to the stationary mold carrier 34. These force transmitting means are the bars 86, which simultaneously serve as the guide means for the closing mechanism C and the movable mold carrier 13. Other elements may also be provided as the force transmitting element, such as so-called "C-shaped clamps", for example, which conduct the forces, which occur during closure and during injection molding, around the mold clamping chamber R from the stationary mold carrier 34 to the movable mold carrier 13, as is known to the person skilled in the art.

Figure 1:
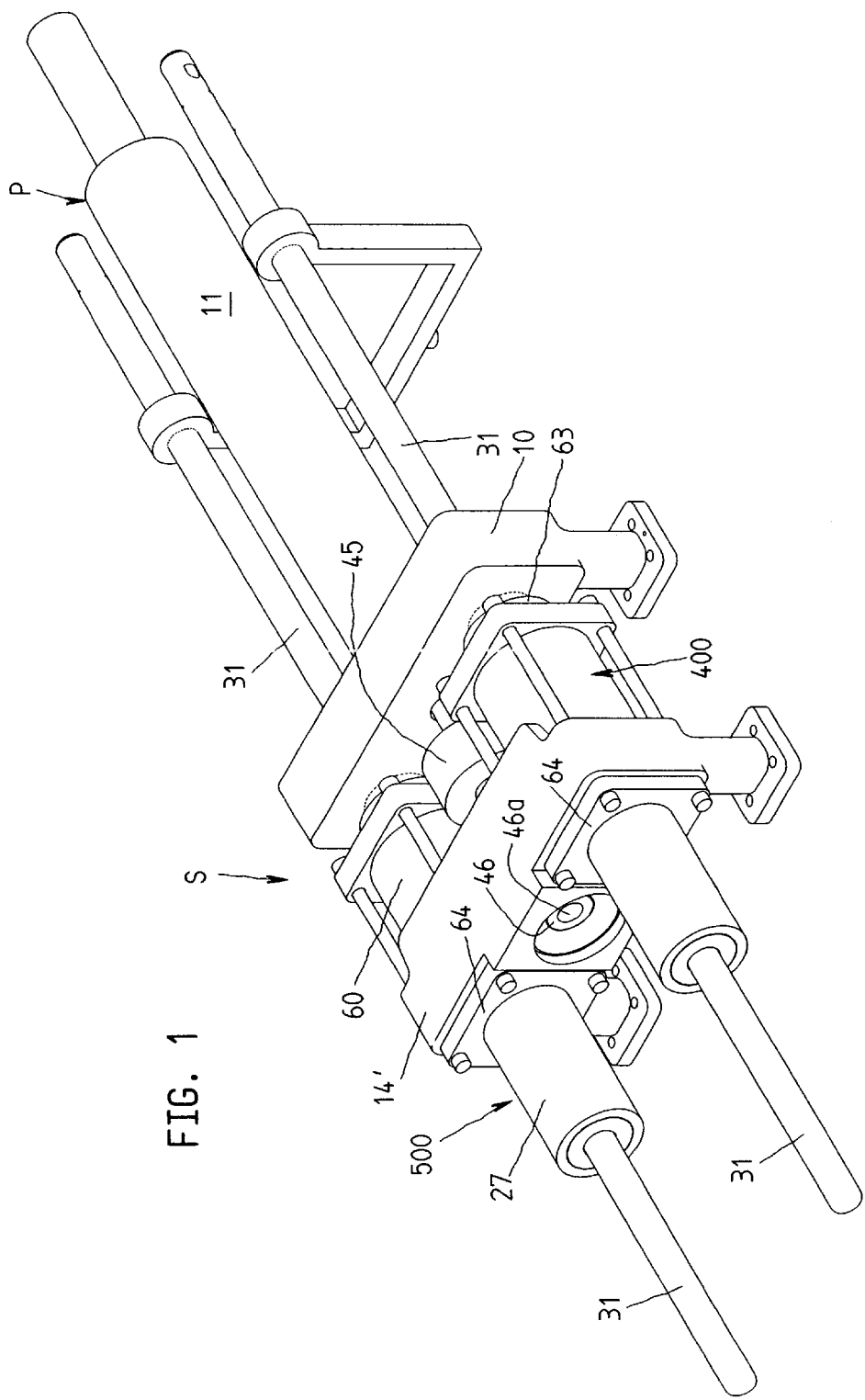
FIG. 1 is a three-dimensional view of the injection molding unit taken in the direction of the injection bridge, all of the driving groups being hydraulically operated.
Figure 11:
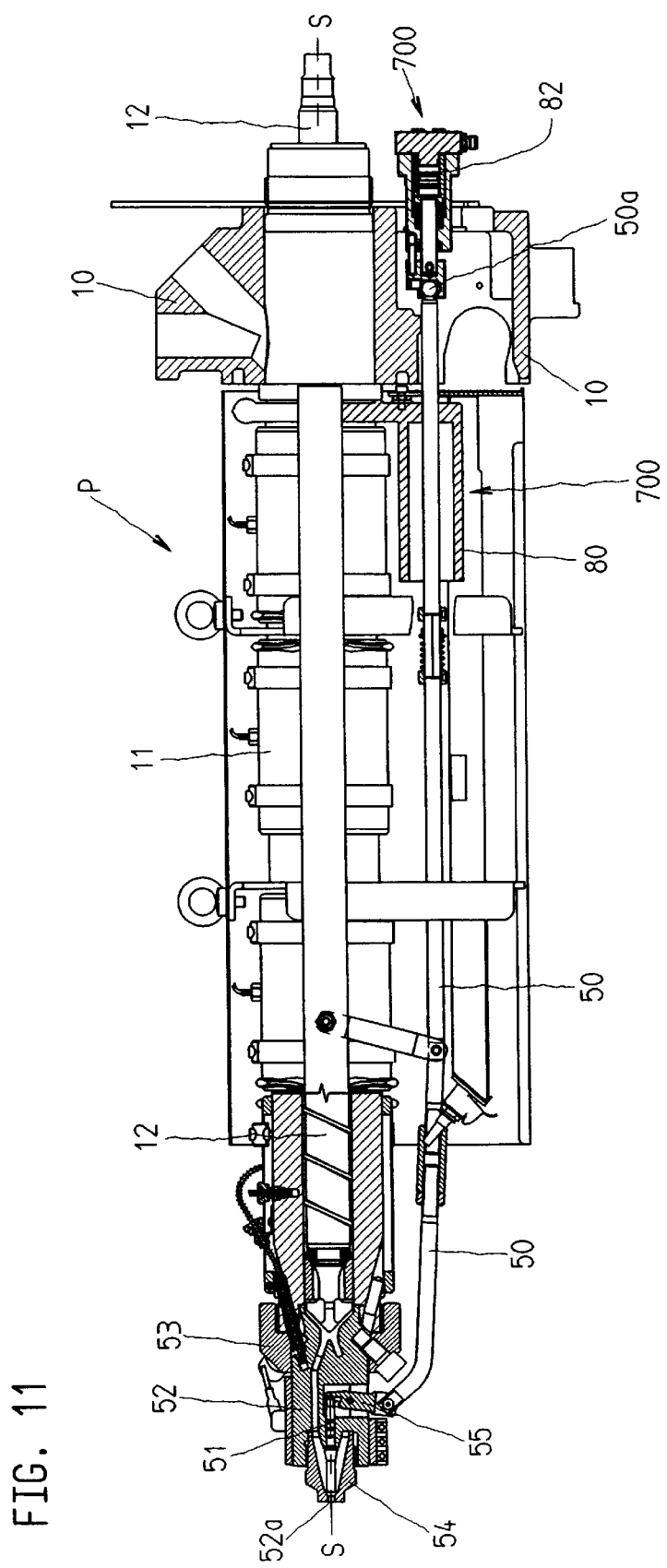
FIG. 11 is a side elevational view, partially in cross-section, of a plasticizing cylinder, mounted on the carrier block, with an hydraulic drive for a closure nozzle.
Figure 12:
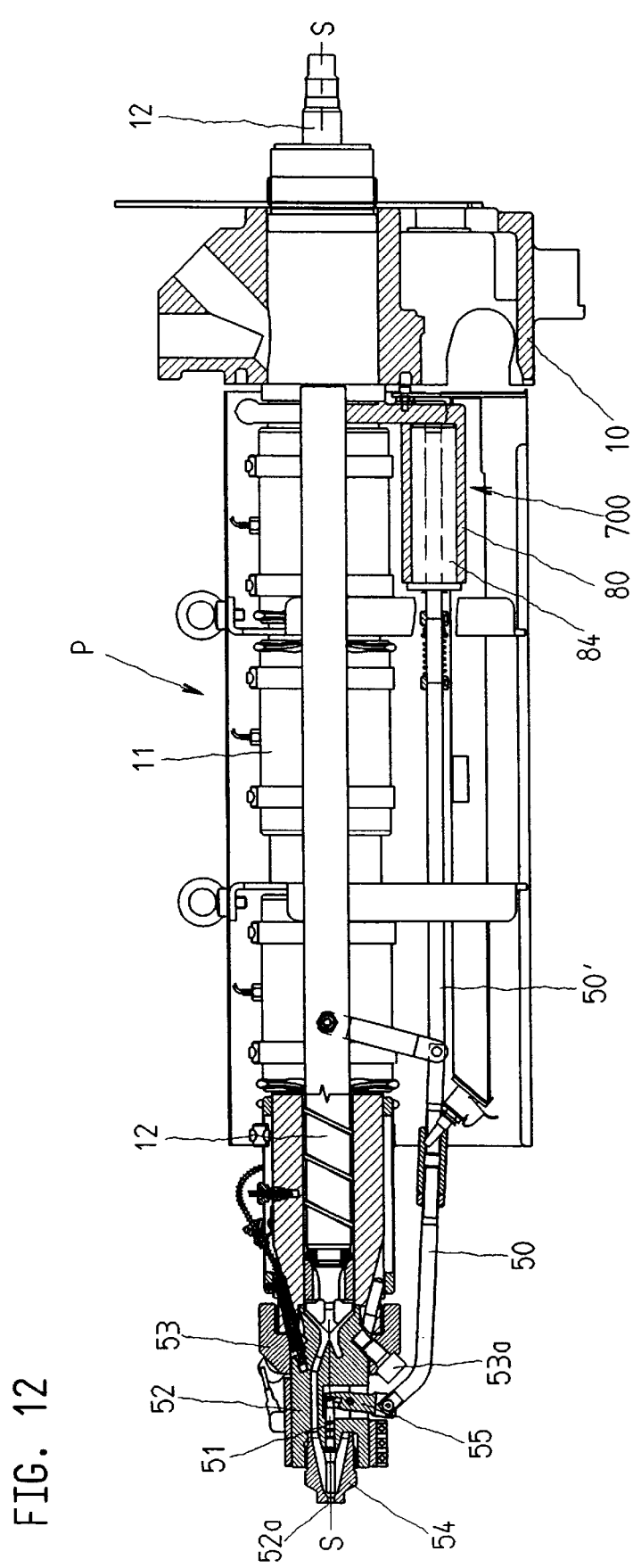
FIG. 12 is a view according to FIG. 11 with an electromechanical drive for the closure nozzle.

According to FIG. 1, the injection molding unit S has a plasticizing unit P, which includes a plasticizing cylinder 11 and a feeding means 12, which is accommodated in the plasticizing cylinder. At the end face, the injection molding unit terminates with a nozzle body 52, which includes a nozzle mouth 52a, which lies in an injection axis s—s (FIGS. 11, 12). The plasticizing unit P is detachably mounted on a carrier block 10, which is displaceably disposed on the machine base 35 along the injection axis s—s.

Furthermore, the injection molding unit S includes an injection bridge 14 as well as a metering drive 41, 41', 41" for the feeding means 12 and the plasticizing unit P as the third driving group 300, which is connectable to the injection bridge 14. The metering drive is more especially used to rotate the feeding means, since this feeding means is mainly a feeding screw. If a feeding piston is provided here, the third driving group 300 coincides with the injecting means 43 of the fifth driving group 500.

At least one drive, which is axis-parallel to the injection axis s—s, is provided as the injecting means—but a plurality of drives are provided mainly to achieve a symmetrical introduction of force—which drive serves as the fifth driving group 500 for the movement of the feeding means 12 relative to the plasticizing cylinder 11. Because of this axial movement of the feeding means, the plasticized material situated in front of the feeding screw is injected into the mold cavity of the injection molding M.

Furthermore, in order to permit the injection molding unit S to be lifted from the stationary mold carrier 34, or respectively to permit such to be deposited on said mold carrier, at least one nozzle moving drive 42, which is axis-parallel to the injection axis s—s, is provided as the fourth driving group 400. As in the embodiment, a plurality of drives may also be provided here.

If the plasticized material injected into the mold cavity is hardened, it is ejected as a molding via an ejector unit 24, which is disposed at any desirable location within the injection molding machine, but mainly in the injection axis s—s on the mold closing side. However, the ejector unit 24 may also be configured as a core puller. The drive for ejector unit 24, or respectively core puller, is effected via a sixth driving group 600.

Finally, a seventh driving group 700 is provided, via which a nozzle needle 51 is actuatable via a rod assembly 50, in order to close the nozzle mouth 52a if necessary in the case of a closure nozzle.

Multifunctional elements may be distributed over the injection molding machine. At least one of the driving groups 100,200,300,400,500,600,700 is connected to the injection molding machine via at least one of these multifunctional elements. In this respect, the multifunctional element serves as the interface for the connection of different drive types. It selectively permits the connection of at least two different drive types, such as, for example, electromechanical drives, hydraulic drives, pneumatic drives, linear motor drives or electromagnetic drives. By using these multifunctional elements, it is possible for the rest of the injection molding machine to remain unchanged as far as possible. The modularity can be completed thereby, so that compliance with the wishes of individual customers can be achieved more rapidly. At the same time, the customer himself can exchange drive types in a short time depending on the intended purpose of use and adapt such to the particular requirements. For such purpose, sufficient space on the injection molding machine is made available for the driving groups 100,200,300,400,500,600,700, irrespective of the particular drive, to accommodate any drive type. Furthermore, the multifunctional elements are so dimensioned that they also satisfy the various loadings which the individual drive types bring with them.

This explained more detailed hereinafter with reference to various Examples.

Figure 2:
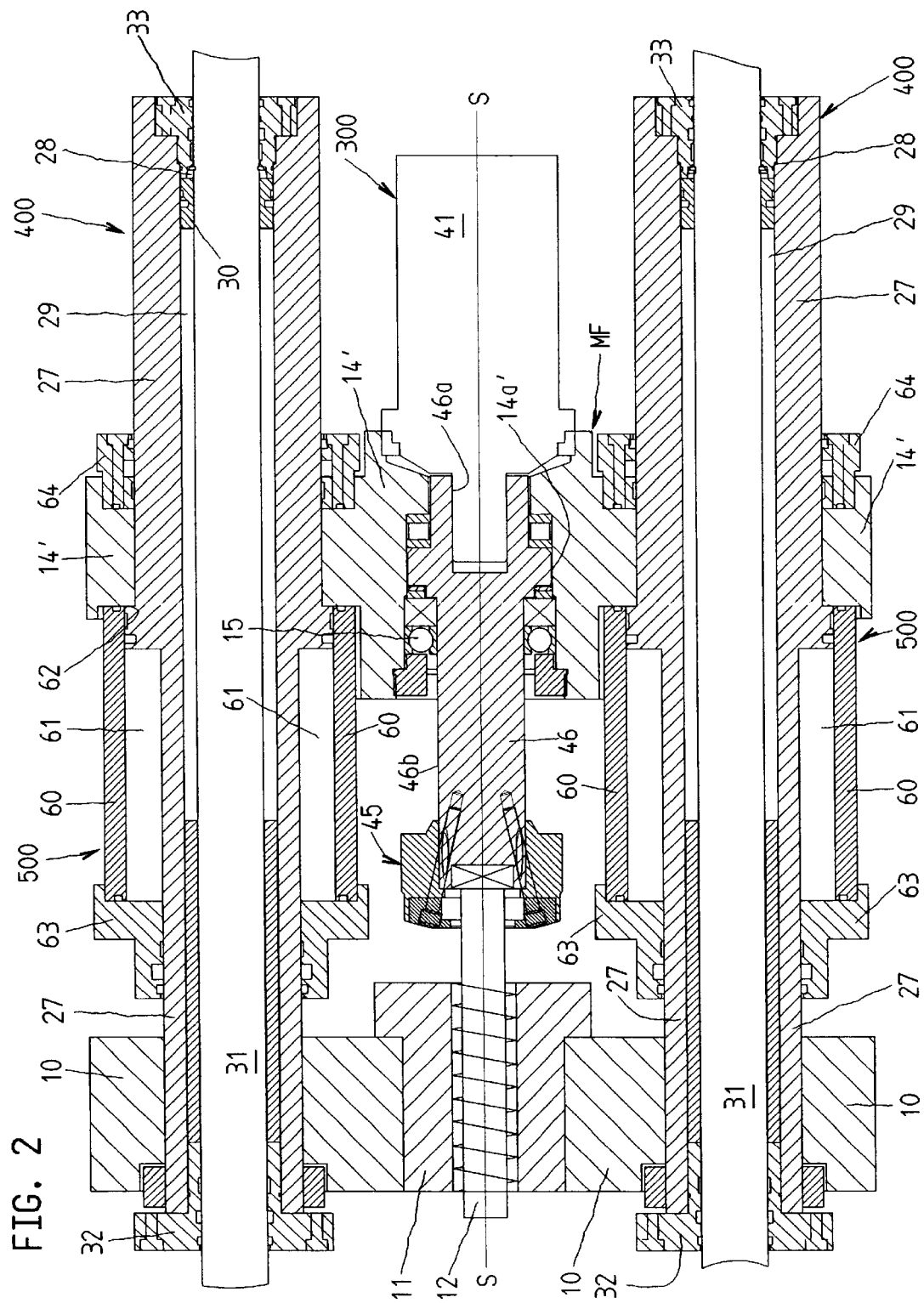
FIG. 2 is a cross-sectional view through the injection molding unit of FIG. 1.

FIG. 1 illustrates a purely hydraulic injection molding unit. This injection molding unit is also shown in FIG. 2 partially in enlarged cross-section. An injection cylinder 60, with cylinder chambers 61 and 62, serves as the injecting means as the fifth driving group 500. This injecting cylinder is closed by cylinder covers 63 and 64, which slide along the cylinder 27 of a nozzle moving unit of the fourth driving group 400. By actuating the cylinder chambers 61, 62 with hydraulic medium or pneumatically, the injection bridge 14' is moved along the injection axis s—s, whereby the feeding means 12 is axially moved in the plasticizing cylinder 11 during this movement. The plasticizing cylinder 11 is detachably mounted on the carrier block 10, and the cylinder 27 is also secured to said block. The cylinder 27 is coaxially penetrated by bars 31, which simultaneously carry the piston 30 for the fourth driving group 400 of the nozzle moving drives. In this respect, a known fully hydraulic embodiment is involved up to now, wherein the injecting cylinder and nozzle moving drive are disposed coaxially with each other.

The injection bridge 14' carries centrally a rotation transmitting element 46 which, together with the injection bridge 14', is configured as the multifunctional element for the third driving group 300. The rotation transmitting element 46 serves to transmit the rotation of a metering drive 41, which serves to prepare the material which is to be processed and, in addition, rotates the feeding means, which is configured as a feeding screw. The rotation transmitting element 46 is situated in a recess 14a' of the injection bridge 14' and is rotatably mounted there via bearings 15 and also secured in the axial direction.

Figure 3:
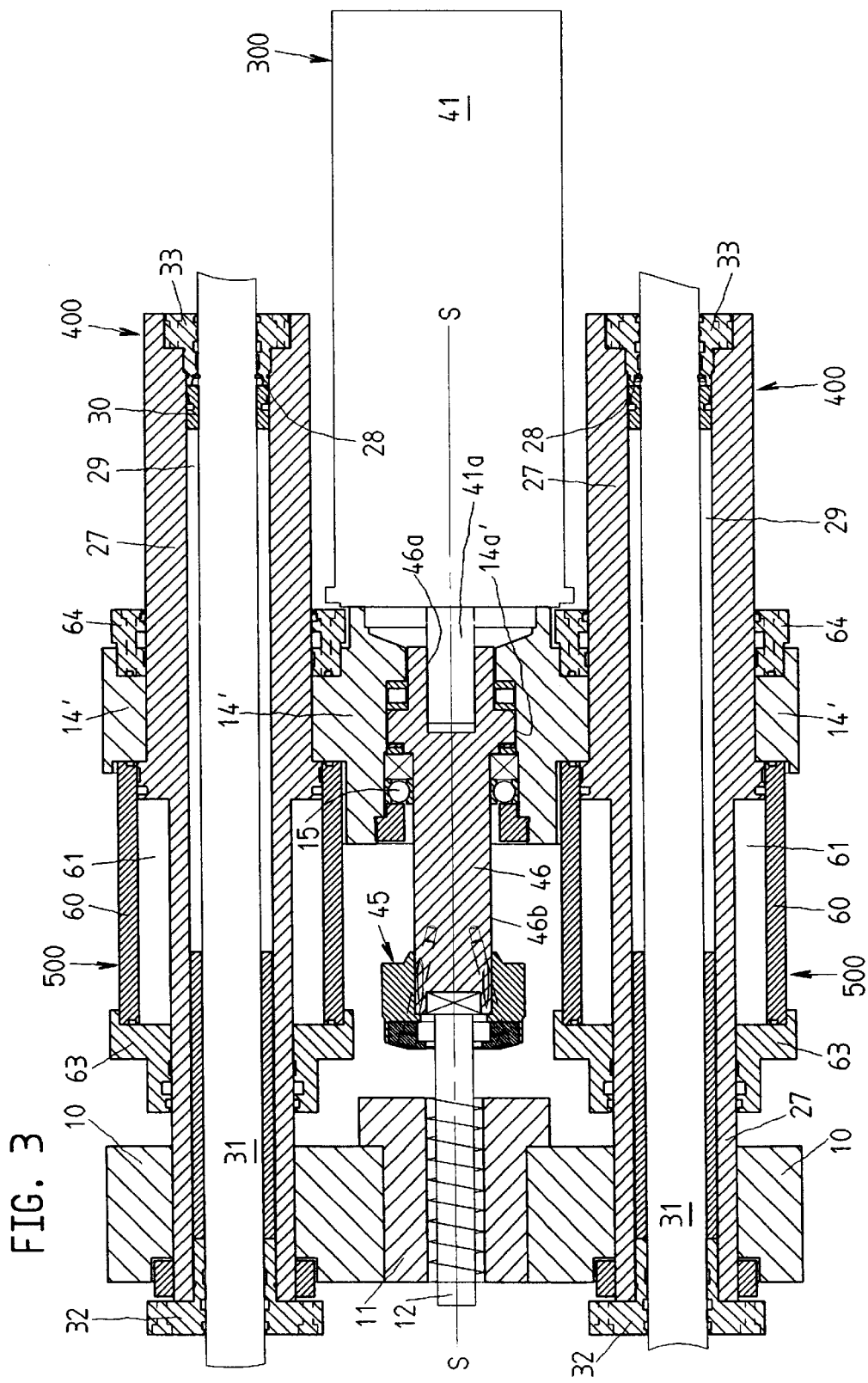
FIG. 3 is a cross-sectional view according to FIG. 2, the metering drive being effected electrically via a high-torque motor.

On its rear side, the rotation transmitting element 46 has a recess 46a, in which the drive shaft 41a of the metering drive 41 engages for operative connection. In FIG. 2, the metering drive is an hydraulic rotary motor, but an electrically operated high-torque motor may also be used instead, as in FIG. 3. In this respect, both motors engage with the same recess 46a, which is clearly apparent in FIG. 1.

Figure 4:
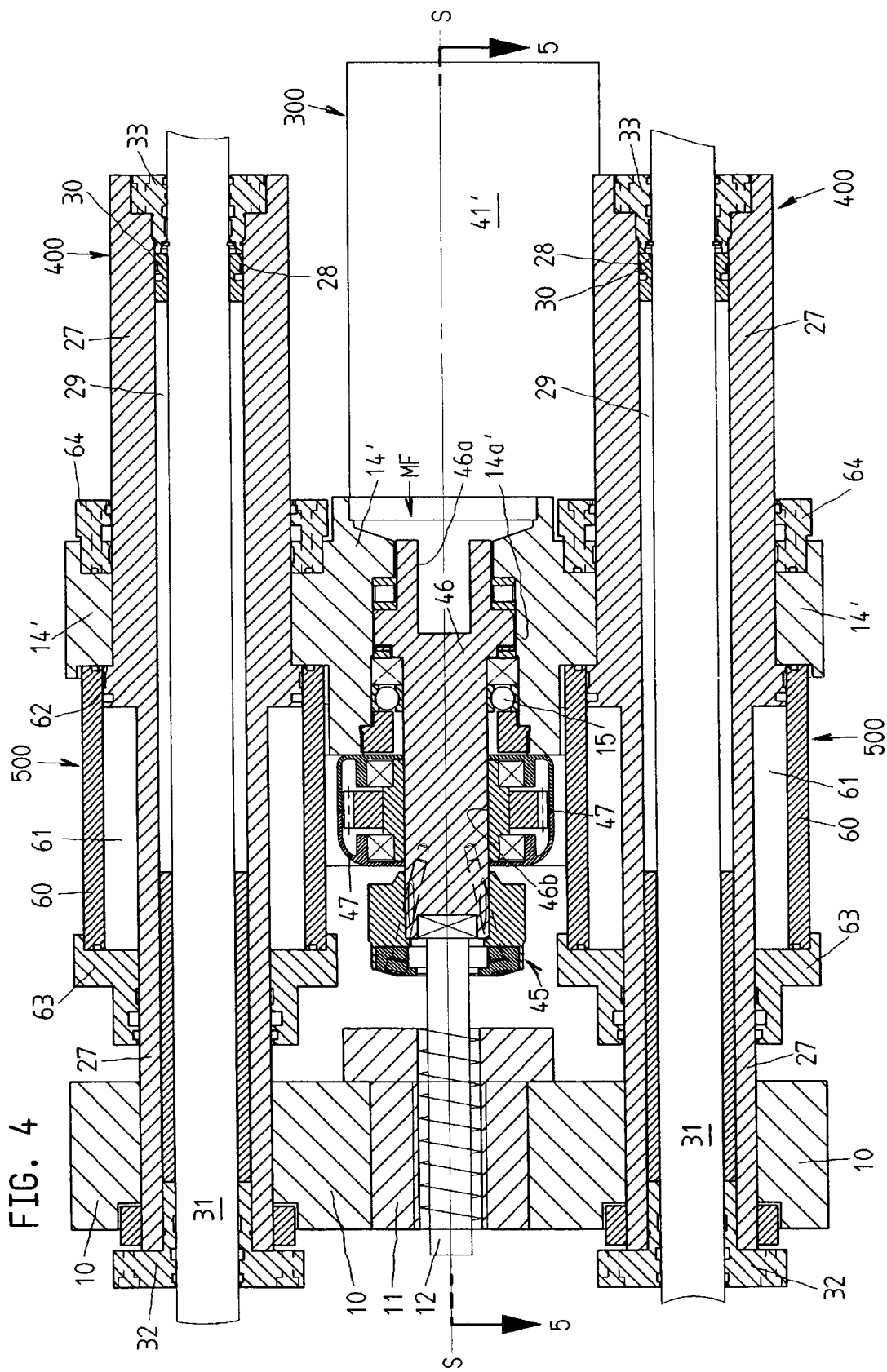
FIG. 4 is a cross-sectional view according to FIG. 2, the feeding means being rotated by a servomotor via a transmission.

While, in FIG. 4, the fifth driving group 500 and the fourth driving group 400 are hydraulically constructed, and the nozzle movement is effected by actuating the cylinder chambers 28 and 29, a transmission housing 47 is now disposed on a portion 46b of the rotation transmitting element 46. The recess 46a has no function here. The portion 46b protrudes forwardly from the injection bridge 14', so that the transmission housing 47, with the associated transmission, can be connected there. The drive is effected via a metering drive 41'. In such case, the portion 46b clearly shows the principle pursued here. From a constructive point of view, not only is the portion 46b provided for the connection of the transmission, but the space is also provided on the injection molding machine, so that the elements of the different drive types can be accommodated at any time.

Figure 5:
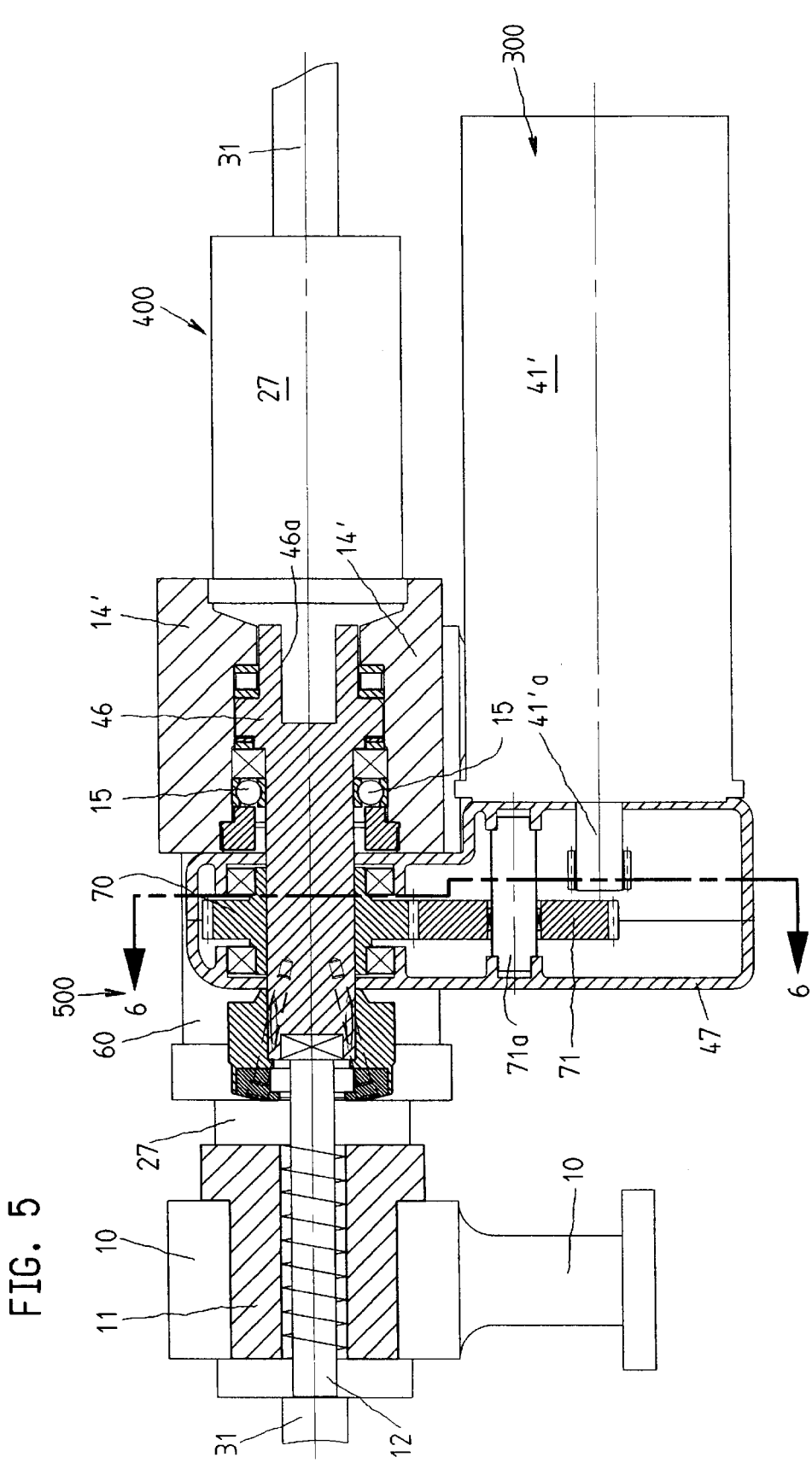
FIG. 5 is a cross-sectional view taken along the line 5—5 of FIG. 4.
Figure 6:
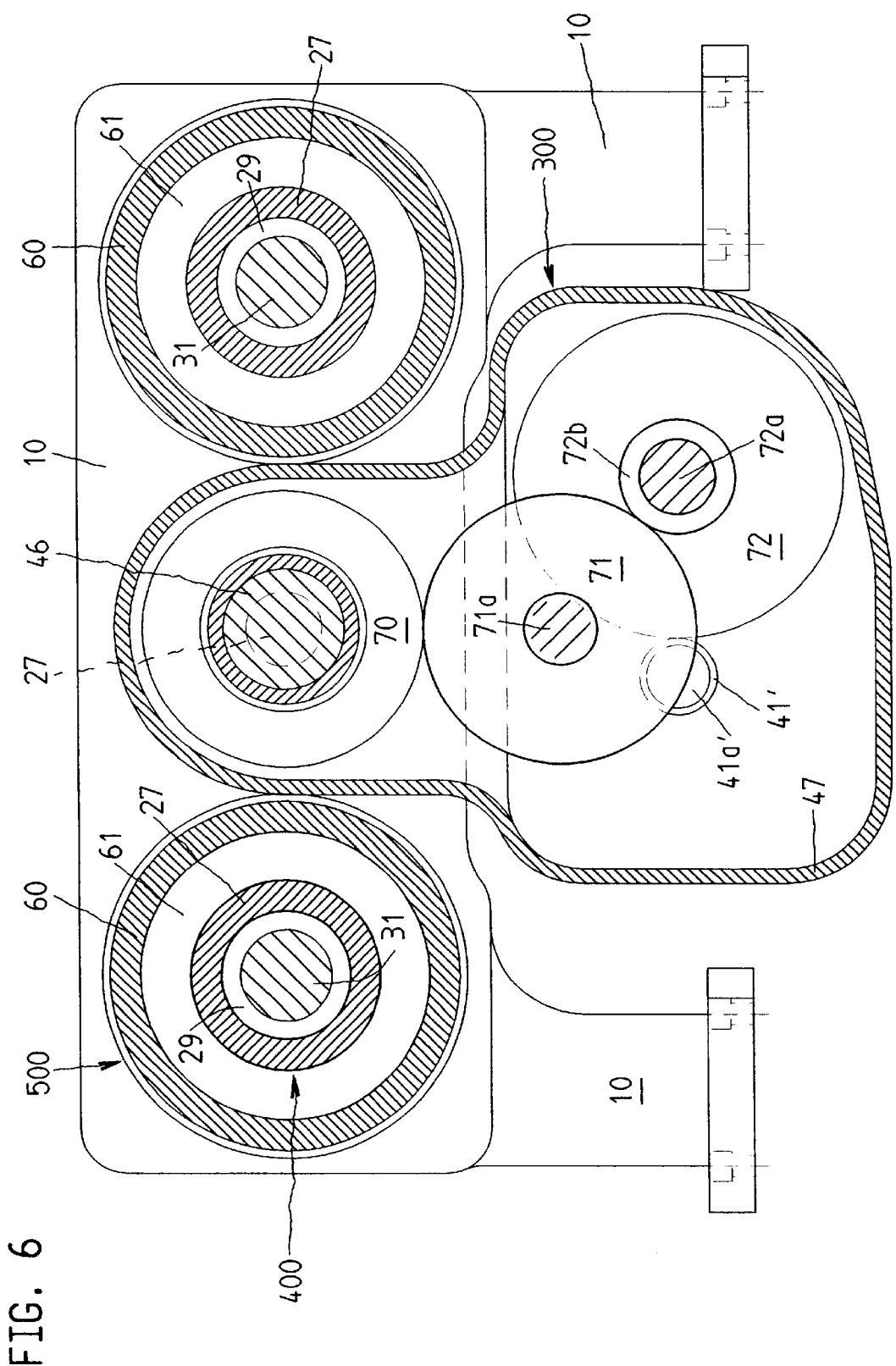
FIG. 6 is a cross-sectional view through the injection molding unit in the region of the transmission taken along the line 6—6 of FIG. 5.
Figure 7:
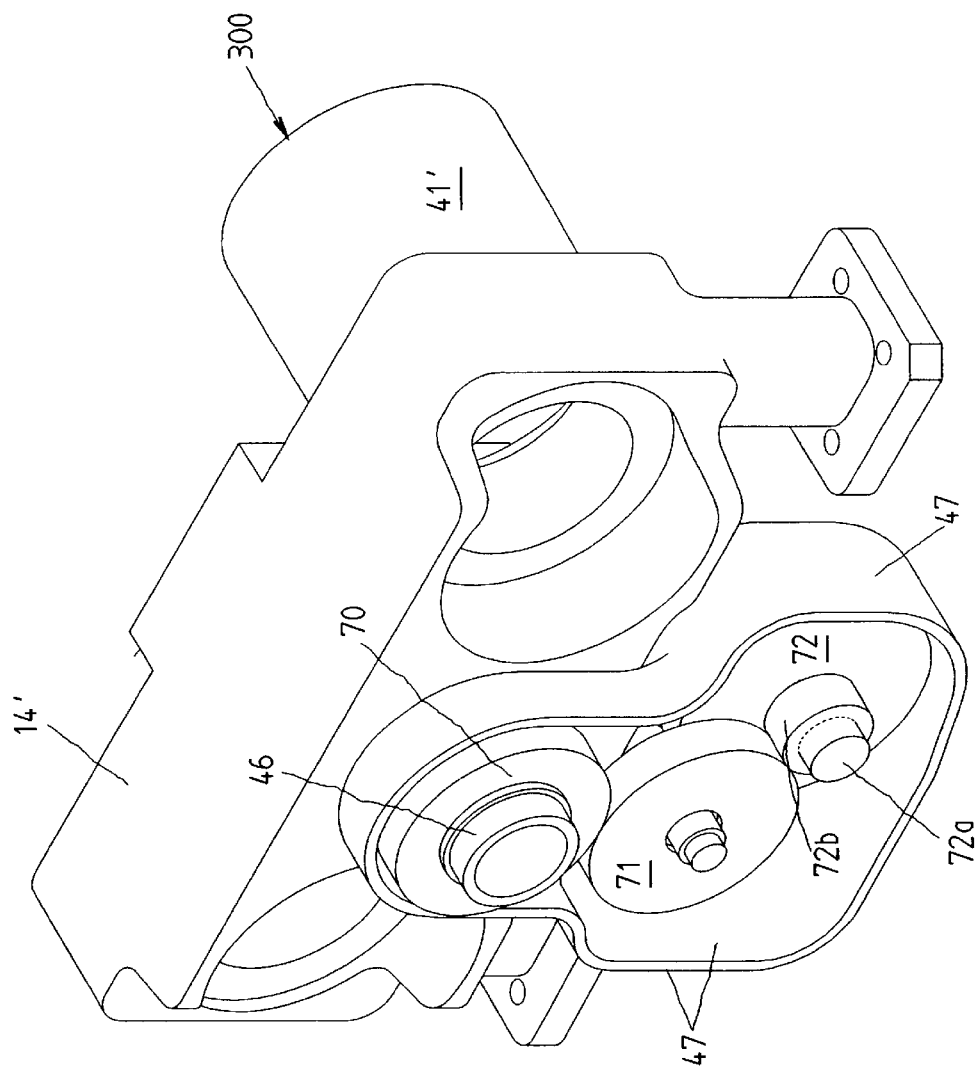
FIG. 7 is a three-dimensional view of the injection bridge and transmission.

The structure of transmission and metering motor 41' of the third driving group 300 is found in FIGS. 5 to 7. According to FIGS. 6 and 7, the metering motor 41' drives the pinion 72 with a drive shaft 41 a'. The pinion 72 is mounted in the transmission housing with the spindle 72a and has, on the same spindle, a smaller pinion 72b, which meshes with the pinion 71. According to FIG. 5, the pinion 71 is also mounted in the transmission housing 47 with its spindle 71a. The pinion 71 meshes with the pinion 70, which is connected to the rotation transmitting element 46 according to FIG. 5. In order to effect the connection between the transmission and servomotor instead of the metering drives 41, the metering motor 41 has to be removed from the recess 46a with its drive shaft 41a. Then the locking mechanism 45, which locks the rotation transmitting element 46 with the feeding means 12, has to be removed so that the transmission can be flange-mounted, possibly together with the servomotor, in the portion 46b.

Figure 8:
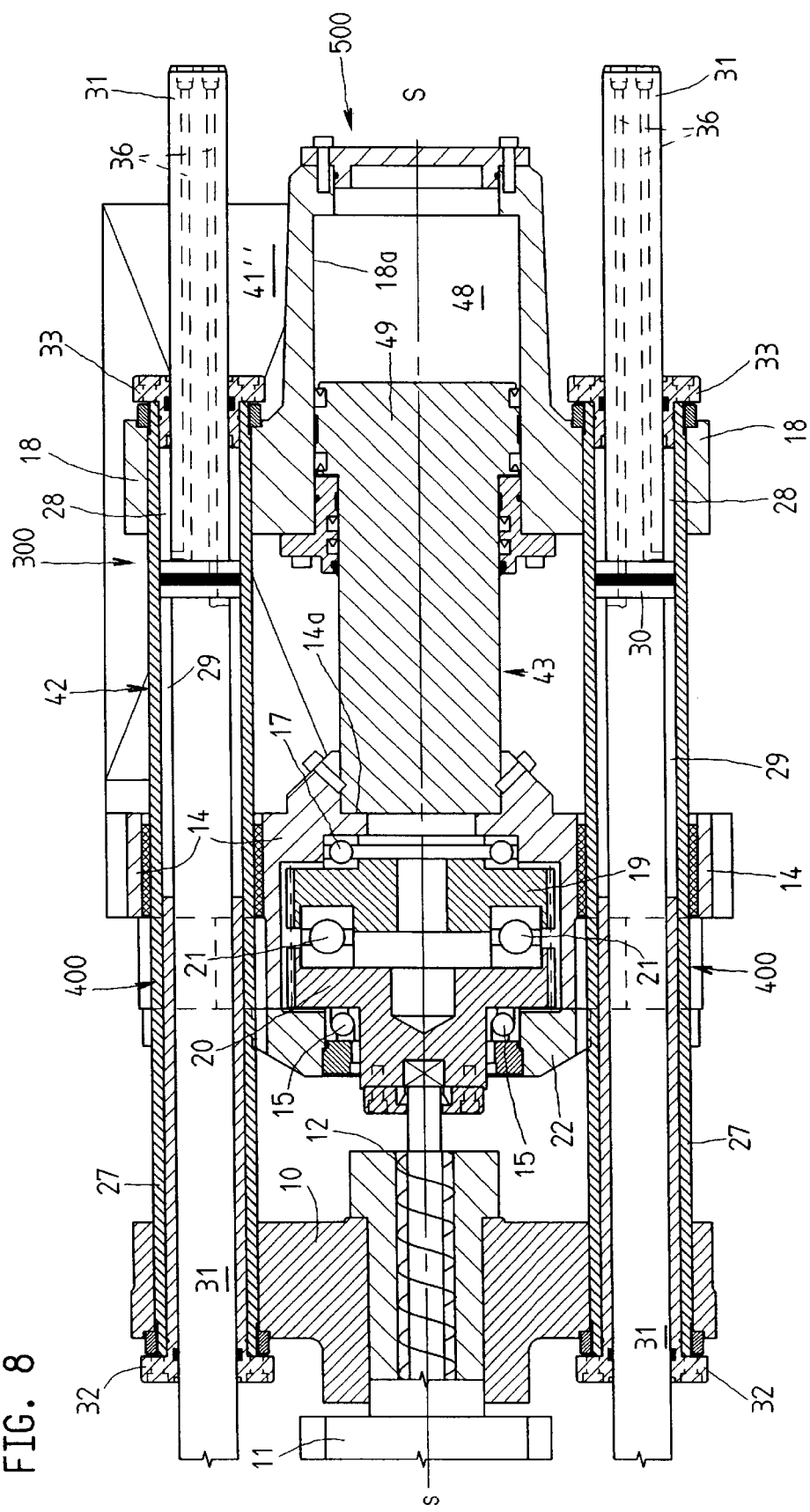
FIG. 8 is a cross-sectional view according to FIG. 2 with a modified injection bridge and hydraulic injection.
Figure 9:
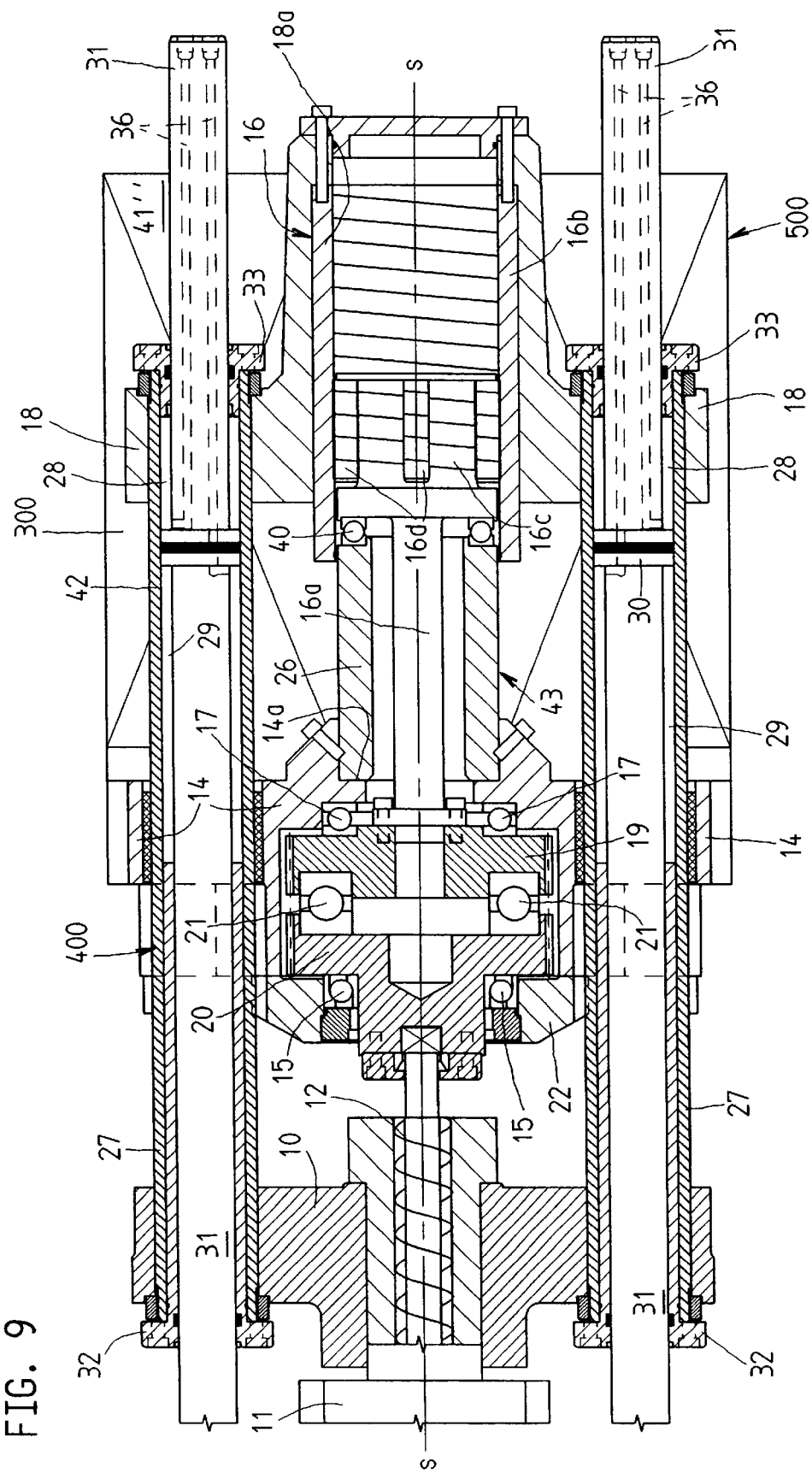
FIG. 9 is a cross-sectional view according to FIG. 8 with an electromechanical injection unit.
Figure 10:
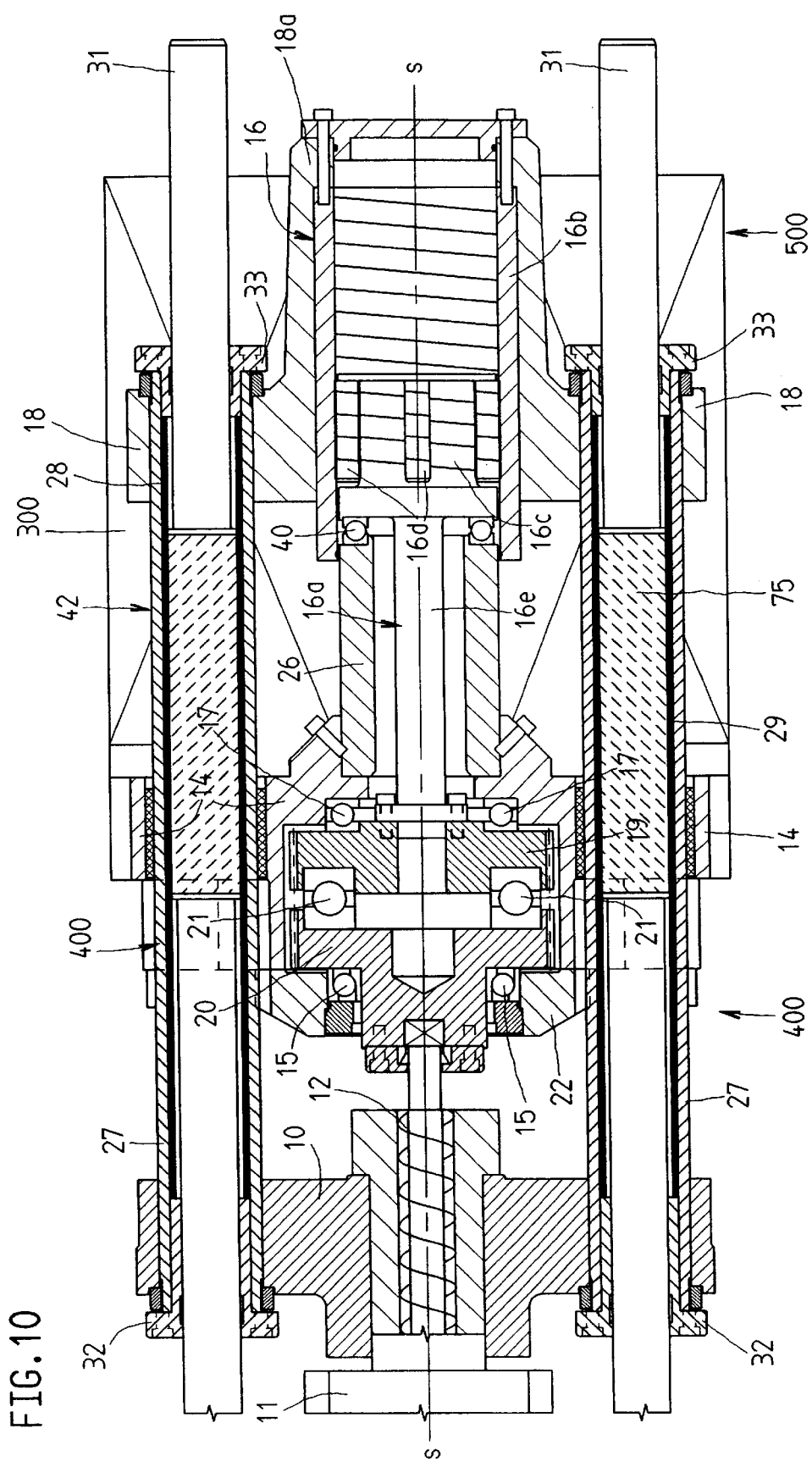
FIG. 10 is a cross-sectional view according to FIG. 8, the nozzle moving drive being a linear motor.

FIGS. 8 to 10 illustrate an alternative embodiment of the metering drive and, above all, the injection means 43. Here, the injection bridge 14 is provided as the multifunctional element for the fifth assembly 500 and includes an abutment face 14a. According to FIG. 8, this abutment face may serve as an abutment for a pressure transmitting element, which is configured as the injecting means 43. The pressure transmitting element is supported on a support 18. According to FIG. 8, the support 18 is situated at one end of the cylinder 27, while the carrier block is disposed at the other end of the cylinder 27, so that a framework of forces is formed via the cylinder 27, and the injecting means 43 is supported via said framework.

In FIG. 8, an hydraulic or a pneumatic piston 49 is provided as the injecting means 43. This piston is guided in a cup-like recess 18a of the support 18. If the hydraulic chamber 48 there is actuated, the piston 49 is pressed in the direction towards the carrier block, whereby it transmits its force, via the recess 14a, to the injection bridge which transmits this force to the feeding means 12. An electromotor is provided as the metering driver 41' and drives, via a transmission, the additional driving element 20 which is mounted in the injection bridge via bearings 15. A first driving element 19, which has no function here, is provided in the injection bridge 14. It is apparent that the cylinder 27 serves as a guide means only for the injection bridge 14 and the support 18, without additional cylinders being interposed, as in FIGS. 1 to 7.

FIG. 9 differs from FIG. 8 because of the fact that an electromechanical drive 16 is provided as the injecting means 43, as known from the prior German Patent Application 197 31 883.9. The cup-like recess 18a of the support 18 supports a part of the electromechanical spindle drive. The rotatable part of this drive, co-operating with this non-rotatable part, is mounted on the injection bridge 14. A threaded tube 16b comes to lie in the cup-like recess and co-operates with a spindle head 16c, the spindle head 16c being disposed on the end of a linear moving means 16a. This linear moving means 16a penetrates the pressure transmitting element, which is configured as pressure tube 26, coaxially and is driven via the first driving element 19, the drive being effected via an electromotor of the fifth driving group 500. Planets 16d are disposed between spindle head 16c and threaded tube 16b. The pressure tube 26, which is mounted in the recess 14a of the injection bridge, immerses in the threaded tube 16b in any position so that the impression of a piston-and-cylinder unit is given externally. This contributes towards protecting the drive unit from contaminants and permits constant lubrication to be introduced. Threaded tube 16b and spindle head communicate with each other via planets 16d. Pressure tube 26 and threaded tube 16b are indirectly connected via an axial bearing element 40. The forces, which occur during injection, are therefore not transmitted to the driving element 19 via the linear moving means 16a, but are transmitted from the threaded tube 16b to the spindle head 16c via the planets 16d. The spindle head passes these forces to the axial bearing element 40, so that the pressure tube becomes the pressure transmitting element. The flux of force passes to the additional driving element 20 and the feeding means 12 via injection bridge 14, bearing element 17 and first driving element 19, via the axial bearing element 21. In consequence, the dimensions of the linear moving means 16a must be adapted only to the rotational forces and no longer to the transmission of pressure.

As explained in the prior patent application, the first driving element 19 and the additional driving element 20 are disposed coaxially with each other. If both driving elements are used according to FIG. 9, the axial bearing element 21 simultaneously serves as the force transmitting element and separating means between the two driving elements, which are driven at different times by their respective drives, metering motor 41" or respectively electromotor of the fifth assembly 500. With regard to advantage and further structure of the arrangement, reference is made to the prior German Patent Application 197 31 883.9, the disclosed content of which in this respect is also expressly made the subject-matter of the present application.

FIG. 10 differs from FIG. 9 because of the fact that the cylinder 27 is the primary element of a linear motor. A secondary element is disposed on the bar 31 as the nozzle moving drive 42. By appropriately actuating the primary element, a movement of the primary element relative to the secondary element is effected, and so is the nozzle movement. A comparison between FIGS. 2, 9 and 10 shows that only the cylinder needs to be appropriately exchanged for different drive types, with the cylinder covers 32, 33 remaining identical. If the various volumes of the hydraulic chambers 61, 62 are omitted in FIG. 2, and if the cylinder were prepared therefor, possibly to be used as the primary element of a linear motor, the cylinder 27 no longer needs to be exchanged basically. Depending on the intended purpose of use, the cylinder 27 serves, like the cylinder covers 32, 33, as the multifunctional element for the fourth assembly 400, said multifunctional element serving either on the inside as the cylinder for an hydraulic annular piston 30 or as a wall for the secondary element 75 of the linear motor. On the outside, the cylinder may be configured as the multifunctional element for the fifth assembly 500, and it serves as the guide means for the injection bridge 14, 14', or it is possibly the piston rod of an hydraulic injecting means 43.

FIGS. 11 and 12 illustrate different embodiments of a plasticizing unit with a closure nozzle. The plasticizing unit P has a plasticizing cylinder 11, in which the feeding means 12 is accommodated. The plasticizing unit is detachably mounted on the carrier block 10, the driving mechanism for the closure nozzle remaining on the plasticizing cylinder during separation. According to FIG. 11, the nozzle needle 51 is actuated via a rod assembly 50 and a pivotal lever 55. The nozzle body 52 is connected to the plasticizing cylinder 11 via a connection sleeve 53. A nozzle insert 54 is disposed in the nozzle body 52. The nozzle mouth 52a lies in the injection axis s—s. In FIG. 11, the rod assembly 50 terminates at a connection point 50a, whereby it is securable on an hydraulic piston-and-cylinder unit. However, a housing wall 80 is provided in FIG. 11 and is changed with the plasticizing cylinder 11. The rod assembly 50 penetrates this housing wall 80. In FIG. 12, this housing wall is used, for example, as the housing of a hollow-shaft motor, which actuates the rod assembly 50' electromechanically via a rolling thread drive 84. The rod assembly 50' is replaced by rod assembly 50. A comparison of the two illustration shows that all of the elements are provided for the connection of a hollow-shaft motor or another electrical motor, so that only rod assembly and driving group need to be exchanged in order, for example, to achieve a conversion to clean-room conditions for the customer.

The desired modularity can also be achieved on the mold closing side at the mold closing unit F. According to FIGS. 13 and 14, the movable mold carrier 13 is configured as the multifunctional element for the first and second driving groups 100, 200. The mold closing unit is supported on the machine base 35 via bearing elements 88. The closing mechanism C is connected to the stationary mold carrier 34 via the guide bars 86. The closing mechanism C moves the movable mold carrier 13 which, in the embodiments, is connected to a first supporting element 25 either via a threaded tube 89 or via the cylinder 110 to form an elongate unit of movement in the form of a framework of forces. Hydraulic driving groups are controlled from an hydraulic block 87. In the fully hydraulic embodiment according to FIG. 13, the movable mold carrier 13 has a recess 13a. The piston rod 111 of the first assembly 100 is mounted at the base of this recess to move the movable mold carrier 13 for mold closure. In this case, the recess 13a is part of a pressure chamber within the cylinder 110. The first driving group 100 is simultaneously the piston rod 111 of the arrangement for applying the closing force of the second driving group 200. It carries the piston 90, which has overflow channels which are closed by a valve piston 91, the movement of which is limited by a boundary element 92.

Figure 13:
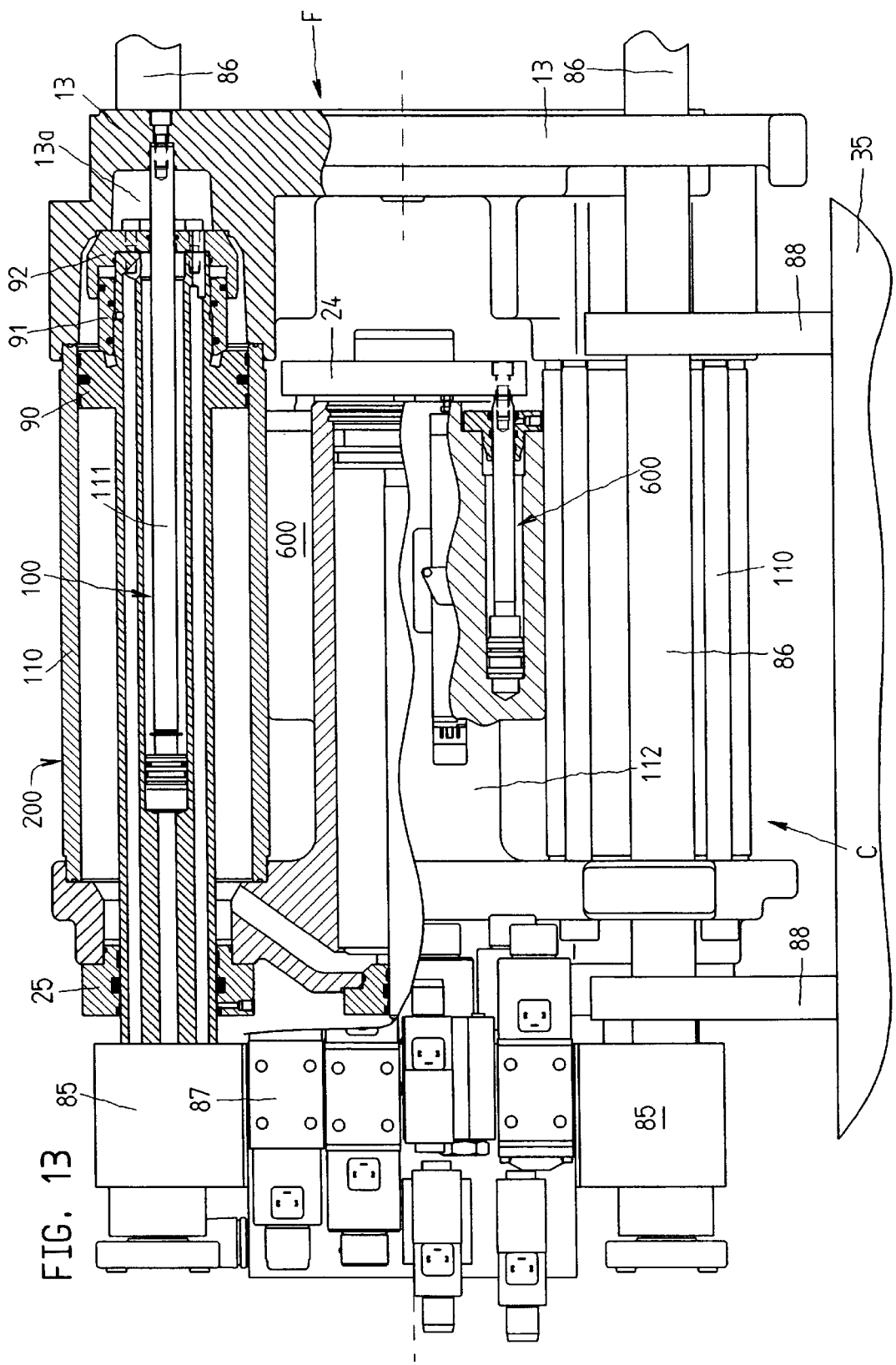
FIG. 13 is a side elevational view, partially in cross-section, of an hydraulically operated mold closing unit.
Figure 14:
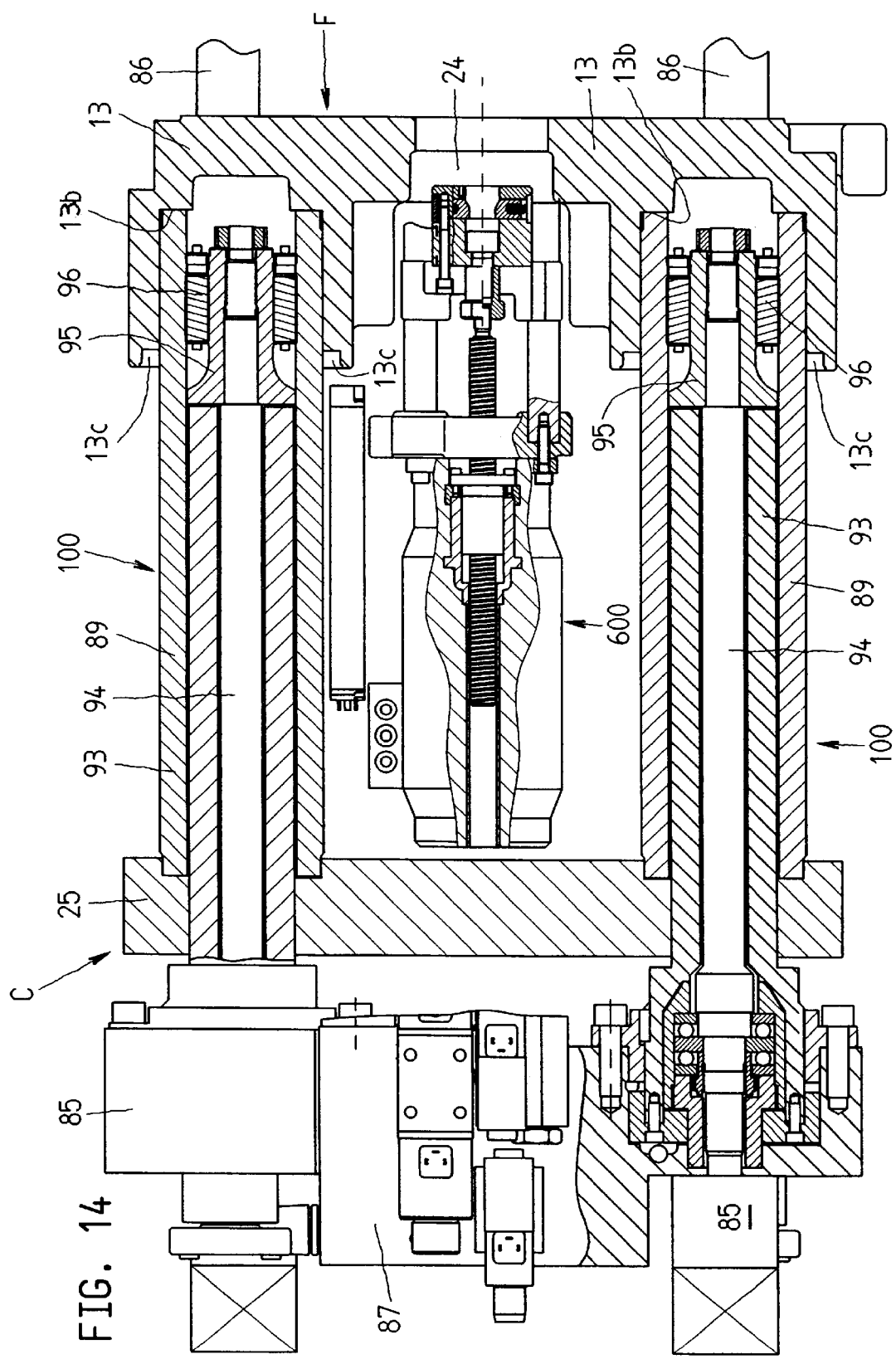
FIG. 14 is a view according to FIG. 13, all of the drives being effected electromechanically.

In FIG. 14, however, the driving groups are electromechanical. Nevertheless, the hydraulic block 87, the additional supporting element 85, the guide bars 86 and, above all, the movable mold carrier 13 are retained. Whereas, in FIG. 13, the cylinder 110 of the second assembly 200 is secured on the edge of the recess 13a to apply the closing force, the recess 13a with an abutment face 13b serves as the abutment for a threaded tube 89 in FIG. 14. This threaded tube communicates with planets 96, which are driven by a spindle head 95. The drive is effected via a drive rod 94, which rotates in a freely displaceable manner in a pressure tube 93. Even during movement, the outward appearance is of a piston-and-cylinder unit. The closing force may be applied in a manner which is not illustrated in the drawing, e.g. by a short-stroke cylinder which co-operates with the additional supporting element 85.

FIGS. 13 and 14 illustrate the sixth driving group 600 of the ejector unit 24. In FIG. 13, two hydraulic piston-and-cylinder units are disposed around an equalizing cylinder 112 and actuate the ejector unit 24 which may also be configured as the core puller. It is precisely in this embodiment that either electromechanical spindle drives may be used instead of the hydraulic piston-and-cylinder units or, for example, the surface of the equalizing cylinder 112 may be simultaneously used as the primary element of a linear motor, a sleeve, which is connected to the ejector 24, being able to be the secondary element in a manner which is not illustrated in the drawing. If the equalizing cylinder is eliminated with the hydraulic solution, the ejector unit 24 may also be disposed directly on the movable mold carrier 13 according to FIG. 14. The ejector unit 24 is configured as an independent structural unit, as known from WO-A 97/12741, the disclosed content of which is hereby made expressly the subject-matter of the present application in this respect. In such case, the drive is a hollow-shaft motor which accommodates the actuating element therein, this ejector unit being usable as the unscrewing arrangement or as the core puller by appropriate rotation transmitting elements. Any other desirable ejector may also be used instead of such an ejector, provided that it is ensured that communication with the movable mold carrier 13 is possible.

Figure 15:
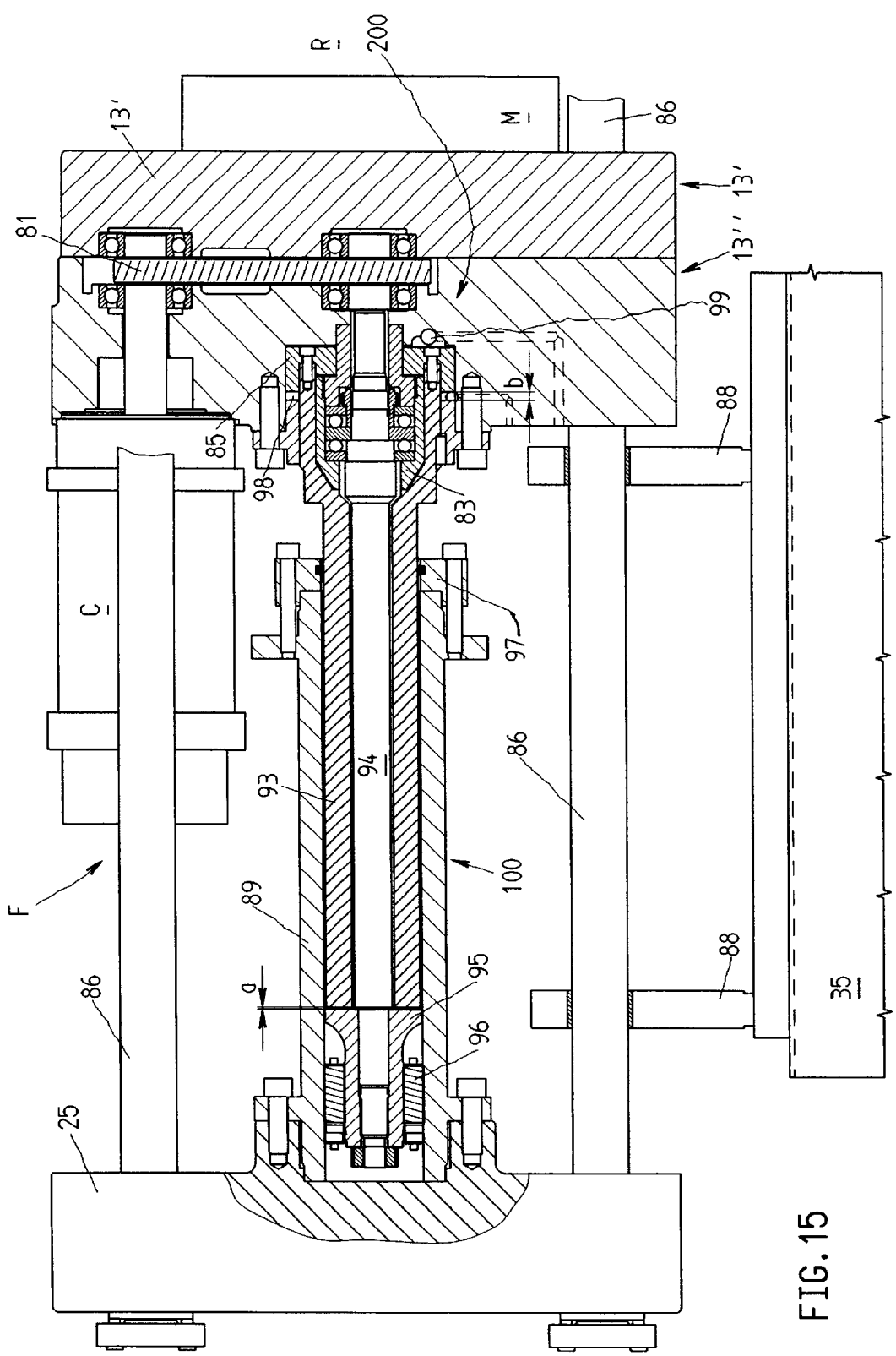
FIG. 15 is a side elevational view of a mold closing unit having an electromechanical closing mechanism and a hydraulic means for applying the closing force.

FIG. 15 illustrates the use of an electromechanical drive unit as the first assembly 100 and the use of an hydraulic unit as the driving group 200. The structure corresponds to the structure in the prior Patent Application 197 50 057.9. The closing mechanism C drives the drive rod 94 via a belt drive 81. The drive rod 91 terminates at the spindle head 95, which communicates with a threaded tube 89 via planets 96. The end face of the threaded tube 89 is closed by a closure element 97, so that the impression of a piston-and-cylinder unit is also given here since the threaded elements are invisible externally. The movable mold carrier is divided into the parts 13' and 13" in order to permit the belt drive 81 to be accommodated therebetween. The first driving group 100 brings the injection mold M for mold closure. By connecting the second driving group, the first driving group 100 comes to abut with its rotatable element 94 whilst reducing the spacing a. This may occur at any time during the movement as a result of the switching chamber 98 being actuated by pressure, so that the additional supporting element 85, which is a piston here, presses the bearing sleeve 83 in FIG. 15 to the left. When the first driving group 100 is actuated, the movable mold carrier 13', 13" is moved to any desirable gap between the mold halves or to the mold closure, a force and, hence, a deformation being initiated at the latest when the two halves of the mold abut against each other, such deformation leading to an earlier or later reduction in the spacing a for the abutment of the pressure tube 93 against the spindle head 95 in dependence on the ratio of forces between the switching chamber 98 and the pressure chamber 98. This abutment prevents further rotation. The pressure chamber 99 is mainly actively connected at any desirable location so that, irrespective of whether a mold closure has already been achieved or not, the switching chamber 98 is actively or passively unloaded. The pressure tube 93 is connected to the additional supporting element 85, which is configured as the piston. The position of the pressure tube can be influenced by the pressure in the switching chamber 98. With regard to the additional structure and the mode of operation of this arrangement, reference is made to the above-mentioned prior German patent application.

To summarize, therefore, the following variable driving systems may be provided on an injection molding machine, this list making no claim to being complete.
1. Side of the injection molding unit
   a) Metering (rotation)
      hydraulically with hydraulic motor (radially, axially, toothed wheel, torque)
      electrically with a constant motor or closed-loop controlled motor and transmission
   b) Injection (translation)
      hydraulically with cylinder
      electrically with conversion of rotation to translation
      pneumatically with cylinder
      electrically with linear motor
   c) Move nozzle (translation)
      hydraulically with cylinder
      electrically with conversion of rotation to translation
      pneumatically with cylinder
      electrically with linear motor
   d) Close nozzle (translation
      hydraulically with cylinder
      pneumatically with cylinder
      electromagnet
      electromotor rotation to translation
      electrically via linear motor
2. Mold closing side.
   a) Move mold (translation)
      hydraulically with cylinder via toggle lever or directly
      electrically with conversion of rotation to translation linear motor
   b) Closing force with high pressure (translation)
      hydraulically with cylinder via toggle lever or directly
      electrically with toggle lever or eccentric
   c) Ejector (translation)
      hydraulically with cylinder
      pneumatically with cylinder
      electrically with conversion of rotation to translation
      electrical linear motor
3. General
   a) Core pullers like ejectors
   b) Protective door like ejector It is self-evident that this description may be subjected to the most varied modifications, changes and adaptations, which range from equivalents to the dependent claims.

What is claimed is:

1. Injection molding machine for processing plastics materials and other plasticisable materials, having a modular structure comprising a plurality of driving groups, said machine comprising:
   a machine base,
   a mold closing unit comprising
      a stationary mold carrier connected to the machine base,
      a movable mold carrier, which provides a mold clamping chamber between itself and the stationary mold carrier.

at least one injection mold, the mold parts of which can be accommodated in the mold clamping chamber on the stationary mold carrier and on the movable mold carrier, a closing mechanism serving as a first driving group for moving the movable mold carrier towards the stationary mold carrier and away from said stationary mold carrier so as to close the injection mold, and force transmitting means for transmitting substantially the closing force from the closing mechanism to the stationary mold carrier, and an injection molding unit, comprising a plasticizing unit, which comprises a plasticizing cylinder and a feeding means, which is accommodated in the plasticizing cylinder, as well as a nozzle mouth on the end face, which mouth lies in an injection axis, a carrier block which is disposed on the machine base so as to be displaceable along the injection axis, and on which block the plasticizing unit is detachably mounted, an injection bridge, a metering drive for the feeding means of the plasticizing unit serving as a second driving group, which is connectable to the injection bridge, at least one nozzle moving drive, which is axis-parallel to the injection axis, as a third driving group for moving the nozzle mouth towards the injection mold and away from said mold, and at least one injecting means, which is axis-parallel to the injection axis, as a fourth driving group for the movement of the feeding means relative to the plasticizing cylinder, wherein at least one of the first, second, third and fourth driving groups is connectable to the injection molding machine via at least one multifunctional element, which serves as an interface selectively for the connection of at least two different drive types selected from the group consisting of electromechanical drives, hydraulic drives, pneumatic drives, linear motors and electromagnetic drives as the driving gruop with an otherwise unchanged injection molding machine, whereby space is made available for the first, second, third and fourth driving groups, independently of the particular drive, on the injection molding machine for accommodating each type of drive.

2. Injection molding machine according to claim 1, wherein the closing mechanism comprises a first supporting element for support purposes, and an arrangement, which is also connectable to the injection molding machine via a multifunctional element, for applying the closing force is provided as a fifth driving group, as soon as the first driving group has transferred the movable mold carrier to achieve the closure of the injection mold.

3. Injection molding machine according to claim 1, wherein an ejector unit is provided as a fifth driving group, which is also connectable to one of the mold carriers via the multifunctional element.

4. Injection molding machine according to claim 3, wherein the ejector unit, acting as a core puller, communicating with the multifunctional element, which communicates with the ejector unit.

5. Injection molding machine according to claim 1, wherein a drive for a nozzle needle of a closable nozzle body is provided as a fifth driving group, which drive is also connectable to the injection molding machine via the multifunctional element.

6. Injection molding machine according to claim 1, wherein, on the side of the injection molding unit, the injection bridge and a rotation transmitting element, which is rotatably mounted herein, for transmitting the rotation of a metering drive for the second driving group are configured as multifunctional elements.

7. Injection molding machine according to claim 6, wherein the rotation transmitting element has a recess, in which the drive shaft of the metering drive engages for the operative connection, the metering drive being an hydraulic rotary motor or an electrically operated high-torque motor.

8. Injection molding machine according to claim 6, wherein a portion of the rotation transmitting element protrudes from the injection bridge, to which a transmission housing, with an associated transmission, is connectable which transmission is driven by the metering drive.

9. Injection molding machine according to claim 1, wherein the injection bridge has an abutment face serving as the multifunctional element for the fourth driving group, which face serves as an abutment for a pressure transmitting element, which is configured as the injecting means and is supported on a support that communicates with the injection bridge, said pressure transmitting element preferably being hydraulically or electromechanically displaceable as the injecting means.

10. Injection molding machine according to claim 9, wherein the support has a cup-like recess, which either forms a cylinder chamber for the injecting means, which is configured as a piston, or accommodates a non-rotatable part of an electromechanical spindle drive, which co-operates with a rotatable part mounted on the injection bridge.

11. Injection molding machine according to claim 10, wherein there is non-rotatably accommodated in the cup-like recess of the support a threaded tube which co-operates with a spindle head, the spindle head being disposed on the end of a linear moving means, which centrally penetrates the pressure transmitting element, configured as a tube, and which is rotatable via a first driving element disposed in the injection bridge.

12. Injection molding machine according to claim 11, wherein a fifth driving element, which is coaxial with the first driving element for the injecting means, is disposed in the injection bridge for the rotation of the feeding means.

13. Injection molding machine according to claim 12, wherein there is provided between first driving element and the fifth driving element an axial bearing element which, on the one hand, serves as the force transmitting element and, on the other hand, serves as the separating means between the first and fifth driving elements.

14. Injection molding machine according to claim 1, wherein cylinder covers, which are disposed on guide bars configured as the force transmitting means, are configured as the multifunctional element for the third driving groups, which covers accommodate therebetween a cylinder, which is configured either as a cylinder for an hydraulic annular piston or as a wall for a secondary element of a linear motor.

15. Injection molding machine according to claim 14, wherein the cylinder of the third driving group is configured on the outside as the multifunctional element for the fourth driving group and serves as a guide for the injection bridge.

16. Injection molding machine according to claim 15, wherein the cylinder is a piston rod for an hydraulic injecting means.

17. Injection molding machine according to claim 5, wherein a housing wall is mounted on the carrier block as the multifunctional element for the attachment of the fifth driving group for actuating the nozzle needle, which wall is either penetrated by a first rod assembly for actuating the nozzle needle when an hydraulic actuation is effected, or is operatively connected to a second rod assembly via a rolling thread drive, the housing wall serving as the housing for said drive.

18. Injection molding machine according to claim 1, wherein the movable mold carrier has, as the multifunctional element for the first and fifth driving groups, a recess which either has a base supporting a threaded tube of an electro-mechanical drive or accommodates a part of an hydraulic piston, a cylinder of said piston being secured on the edge of the recess.

19. Injection molding machine according to claim 2, wherein there is disposed between the first supporting element and movable mold carrier a second supporting element as the multifunctional element, which is actuatable via a switching chamber actuatable with hydraulic medium, the switching chamber permitting the movement of the first driving group when it is under pressure, while the switching chamber blocks the movement of the first driving group when the switching chamber is free of pressure, the pressure of the hydraulic medium in the switching chamber being connectable in exactly the same way as the fifth driving group.

* * * * *